Nov. 13, 1934.　　　J. G. PAULIN　　　1,980,732
COMPENSATING DEVICE IN MEASURING APPARATUS
Filed May 28, 1929　　　3 Sheets-Sheet 1

Inventor:
Josua Gabriel Paulin
By Pennie Davis Marvin & Edmonds
attorneys.

Nov. 13, 1934.   J. G. PAULIN   1,980,732
COMPENSATING DEVICE IN MEASURING APPARATUS
Filed May 28, 1929    3 Sheets-Sheet 2
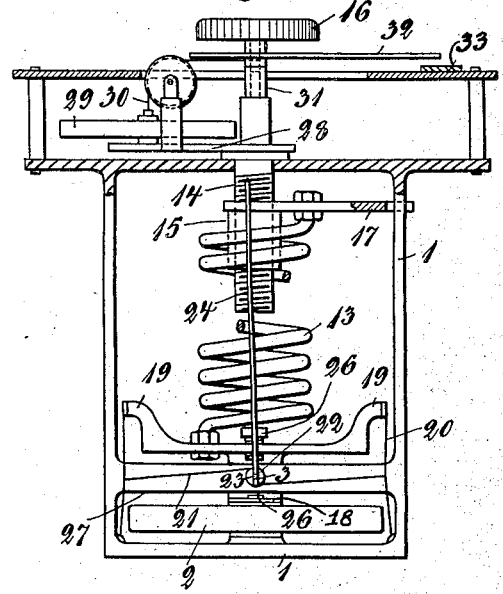
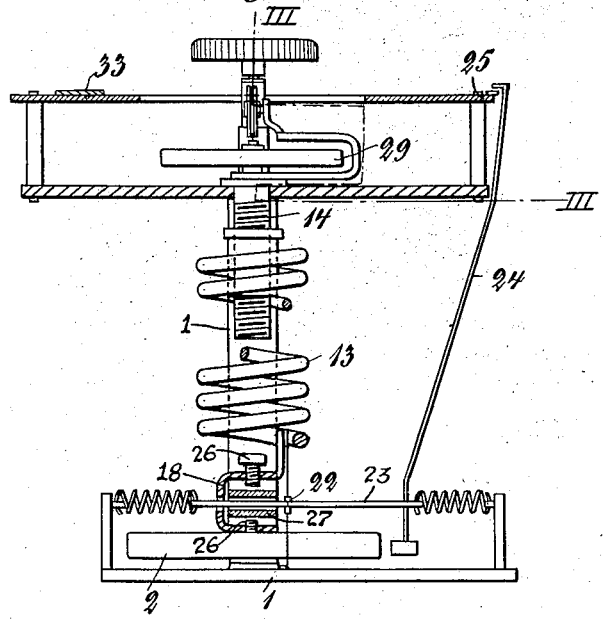

Nov. 13, 1934.     J. G. PAULIN     1,980,732
COMPENSATING DEVICE IN MEASURING APPARATUS
Filed May 28, 1929     3 Sheets-Sheet 3
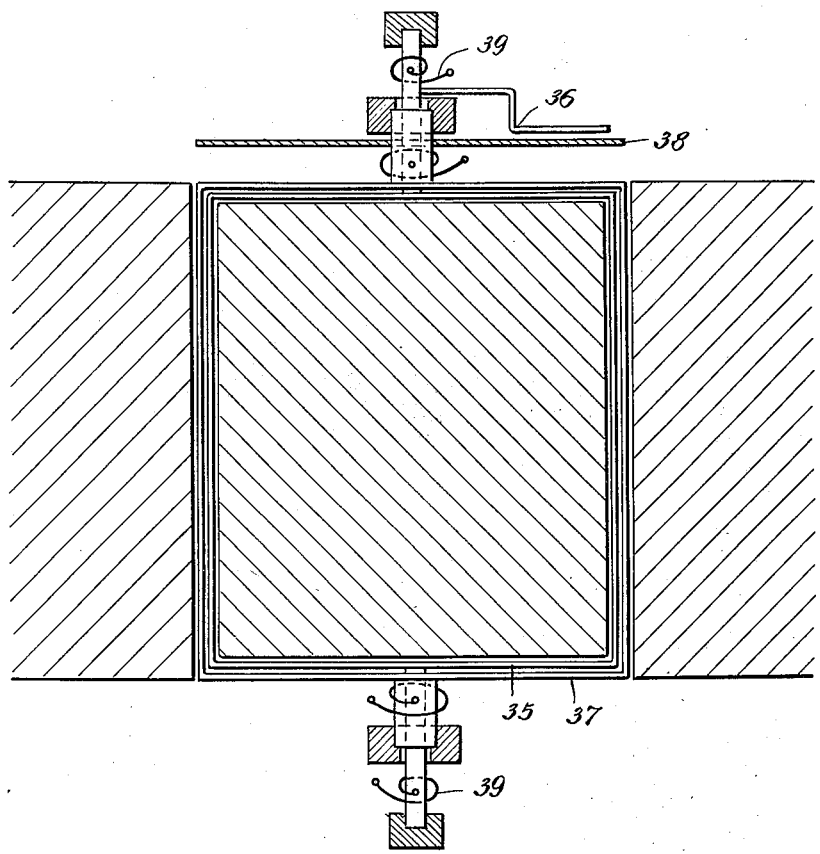
INVENTOR
Josua Gabriel Paulin
BY
Pennie, Davis, Marvin Edmonds
ATTORNEYS Patented Nov. 13, 1934

1,980,732

UNITED STATES PATENT OFFICE 1,980,732

COMPENSATING DEVICE IN MEASURING APPARATUS

Josua Gabriel Paulin, Eskilstuna, Sweden

Application May 28, 1929, Serial No. 366,558
In Sweden June 14, 1928

4 Claims. (Cl. 73—4)

The object of the present invention is to eliminate measuring errors in sensitive apparatus, such as aneroid barometers, due to elastic inertia or hysteresis in the movable system. Previous methods for eliminating such sources of error in aneroid barometers employed two counter-acting diaphragms, each actuating the same common gearing device and the same indicator. The diaphragms were of different size, the one having the smaller operative surface had a considerably larger hysteresis than the other. This known arrangement has, however, the inconvenience that the resulting force transmitted to the indicator by means of the common gearing is considerably reduced by the compensating counter-pressure diaphragm because of frictional resistance set up in the movable system. The adjustment of the elastic qualities of the two diaphragms in relation to each other so as to obtain a relation between the elastic qualities of the two diaphragms corresponding to a complete compensation, also presents great practical difficulties.

These inconveniences are eliminated by the present invention according to which the movements of the measuring member are transmitted to a movable part of an indicating device, by way of example a pointer, by means of a transmission or gearing device independent of the compensating member, whereas the movements of the compensating member are transferred to the same or another movable part of the indicating device either directly or by means of another gearing device. By this arrangement the reduction of the force transmitted to the pointer system, occurring in the known device, is eliminated. Further an exact compensation of the elastic hysteresis in the measuring member can be brought about in a simple manner by a mutual adjustment of the ratios of gearing according to which the movements of the measuring and compensating members are transmitted to the pointer or indicating device.

Figure 2:
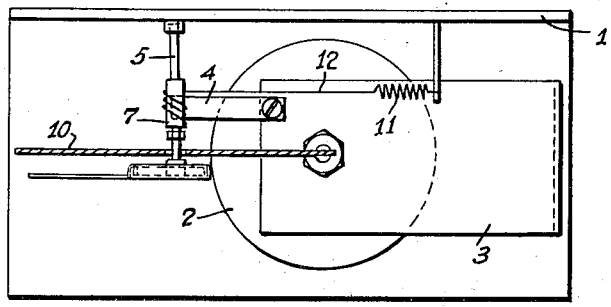
Figure 5:
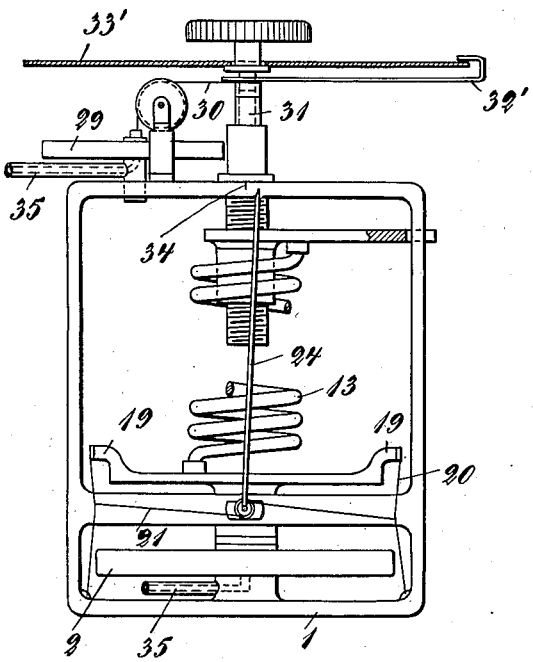
Figure 1:
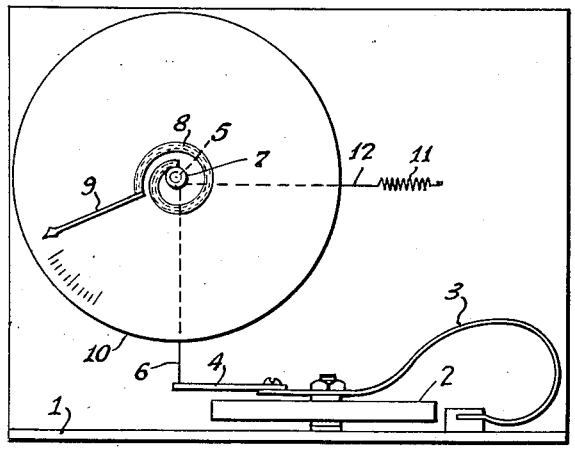

The invention will be more closely described with reference to the accompanying drawings, which show some different embodiments of the pressure measuring apparatus according to the invention. Figures 1 and 2 show a front view and a plan view respectively of an apparatus according to one embodiment. Fig. 3 is a front view of another embodiment, partly shown in section along the line III—III in Fig. 4, which latter is a section perpendicular to the section in Fig. 3. Figure 5 shows a front view of a third embodiment. Figure 6 shows the application of the invention as applied to an ammeter.

In the embodiment according to Figures 1 and 2 the apparatus consists of an aneroid barometer in which the compensating member supports the pointer of the measuring member. The measuring member consists of a diaphragm box 2 disposed on a supporting frame 1 comprising two perpendicularly disposed plates. At one side of the diaphragm the one end of a leaf spring 3 is secured, the other end of which is secured to the frame and which counter-acts the air pressure on the box. The end of the leaf spring secured to the diaphragm box is provided with an extension 4 by means of which the movements of the diaphragm are transmitted to a rotatably journalled shaft 5 by means of a flexible band 6 wound on a pulley 7 of said shaft. The shaft 5 carries the compensating member comprising a small evacuated helical Bourdon-tube 8, the one end of which is soldered to the shaft 5 and the other end of which carries a pointer 9 movable over a scale 10 supported in the frame. The band 6 is stretched by a spring 11 connected to the one end of a flexible band 12 the other end of which is wound on the pulley 7 in opposite direction to the band 6.

If the air pressure is increased, the shaft 5 will turn clockwise under the influence of the measuring member 2, the Bourdon-tube 8 in its entirety then turns in a clockwise direction together with the pointer 9. On the other hand, the increased air pressure will press together the Bourdon-tube, which results in a compensating motion opposite to the turning motion of the shaft 5 being imparted to the pointer 9. The pointer will thus indicate the difference between the indications of the two members due to the increased air pressure. By the selection of suitable material for the Bourdon-tube 8, we obtain elastic settings in this member that become very large in relation to the immediate deformation of the tube under the influence of a change of pressure. As the motions of the compensating member 8 are transferred to the pointer directly, whereas, on the other hand, the motions of the measuring member 2 are transmitted with a certain ratio of gearing, it is possible to attain, by a suitable selection of said ratio, that the indication of the pointer, under the influence of the immediate deformation of the diaphragm box upon a change of pressure, is only inconsiderably lessened by the simultaneous deformation of the compensating member, whereas the reactions exerted on the pointer due to the elastic hysteresis in both members are mutually entirely compensated. The Bourdon-tube 8 together with the pointer 9 may evidently be considered as a deformable pointer system to which the force impulses from the measuring member 2 are transmitted without being subjected to any reduction on account of the compensation. In spite of the compensation one may thus maintain a high sensitivity in the apparatus.

Figures 3 and 4 show another example of a compensated aneroid barometer according to the invention. The instrument is in this case adapted to be read according to a zero method, i. e. the measuring member is adapted to be actuated by means of a zero setting device to restore the measuring member to the zero position before taking a reading, the size of the total shifting of the zero setting device being a measure of the prevailing air pressure. The diaphragm box 2 is secured to the lower part of the frame 1. The outer air pressure acting on the diaphragm is counteracted by a helical spring 13, one end of which, in below described manner, is connected to the diaphragm whereas its upper end is connected to a nut 15 threaded onto a micrometer screw 14. On the upper end of the micrometer screw a turning handle 16 is secured, the micrometer screw being journaled in the frame. The nut 15 is provided with a laterally extending arm 17 the forked end of which embraces a vertical portion of the frame serving as a guide, in such a manner that the nut, at the turning of the micrometer screw by means of the handle 16, is raised and lowered without participating in the rotation and thereby increases and reduces the tension of the spring. The connection between the diaphragm and the counter-spring 13 is formed by a yoke 18 which is secured to the upper side of the diaphragm box and at the upper portion of which the lower end of the counter-spring is secured, said yoke being provided with laterally extending arms 19. At the outer end of each arm, the one end of a band 20 extended so as to form an angle, is fixed, the other end of said band being secured below to the frame. From the points of the angles of the bands 20, bands 21 extend which at their other ends are connected each to one arm of a small pulley 22 which is carried by a horizontal shaft 23 to a tendency pointer 24, the point of which is movable over a fixed scale 25.

The movements of the diaphragm 2 are restricted within narrow limits by two stop abutments 26 which are disposed on the legs of the yoke 18 each on opposite sides of a cross rod 27 in the frame and the one or both of which may be adjustable as, for example, by making the abutment members consist of screws threaded into the legs of the yoke 18, the screws being adjustable in an axial direction.

In known measuring apparatus of the present kind the micrometer screw of the zero setting mechanism is provided with a pointer which after the zero setting directly indicates the air pressure on a fixed scale. In the embodiment according to Figures 3, 4 the pointer is augmented by an additional aneroid system intended as a compensation device and which is supported by an arm 28 mounted rigidly on the micrometer screw and consists of an evacuated diaphragm box 29 the diaphragm of which is suitably formed so as to offer a sufficient resistance against the outer air pressure. The movements of the diaphragm are transmitted by means of a flexible band 30 passing over a pulley journalled on the arm 28 to a freely rotatable sleeve 31 thrust onto the upper studformed thinner end of the micrometer screw which sleeve is provided with a pointer 32 movable over a scale 33 secured to the upper side of the supporting frame. The band 30 is stretched by means of a spring not shown on the drawings disposed by way of example analogous to the spring 11 in Figure 1.

By the selection of a suitable gearing ratio between the diaphragm box 29 and the appertaining pointer 32, one may obtain an error in the deflection of the pointer 32 due to the influence of the elastic hysteresis in the compensating member 29, which becomes equal to and reversed to the error in the setting of the zero setting mechanism. The elastic hysteresis in the compensating member 29 should be several times larger than the elastic hysteresis in the measuring member. By the selection of suitable sheet material for the diaphragms 2 and 29, the elastic hysteresis in the compensating member may be made ten times larger than the elastic hysteresis in the measuring member. The diameter of the sleeve 31 may then be so dimensioned that the turning of the pointer 32 during the influence of the diaphragm 29 at a change of pressure corresponds to a tenth part of the angle which the micrometer screw should be turned to set the tendency pointer in zero position after the same change of pressure. By this arrangement a complete elimination of the elastic hysteresis may take place.

The apparatus functions in the following manner. As long as the zero setting device is not actuated the diaphragm system is free to move within the interval limited by the abutments 26 or rests against one of said abutments according as the actual air pressure differs less or more from the pressure which corresponds to the intermediate normal position of the diaphragm. On the other hand, the diaphragm of the compensated system 29 is steadily actuated by the air variations, the pointer 32 then deflecting over a corresponding scale 33. Upon actuating the zero setting device by means of the handle 16 the entire compensating system 28, 29, 30 is rotated together with the micrometer screw, the parts of the compensating system then retaining their positions unchanged in relation to each other provided the air pressure is constant during this operation. The pointer 32 will thus move over the scale 33 as if it were rigidly connected to the micrometer screw. It may be assumed, by way of example, that the tendency pointer 24 at a rise of the air pressure deflects from the zero position such an angle that the micrometer screw must be turned an angle of 90° in a clockwise direction to reset the tendency pointer in the zero position. By the rise of the air pressure the diaphragm box 29 has, however, at the same time been compressed which results in that the pointer 32 has turned an angle of 9° in relation to the micrometer screw provided the ratio between the elastic hysteresis and the ratios of gearing are selected according to the above assumption. The compensating deflection takes place in opposite direction to the zero setting motion that is to say in a counter-clockwise direction. The deflections due to the two systems will thus be subtracted the one from the other in the final result which is read off on the scale of the pointer 32.

Figure 5 shows an application of the invention to an apparatus for measuring the pressure in a vessel or a container. The measuring system is also in this case designed for a reading off according to the zero setting method and is completely analogous with the measuring system in the embodiment according to Figures 3, 4. In this case, the reading off scale 33' is, however, supported by and rigidly connected to the micrometer screw. The motions of the tendency pointer 24 are observed in relation to a zero line 34 disposed on the frame. The compensating system is supported by the frame and consists as in the above described embodiment of a diaphragm box 29, the diaphragm motions of which are transmitted to a sleeve 31, journalled on the micrometer screw and carrying the pointer 32', by means of a flexible-band 30 passing over a pulley, in this case journalled in the frame. The diaphragm boxes 2 and 29 communicate through tubes 35 with the vessel in which the pressure has to be measured. At a change of the pressure in the vessel the pointer 32' will deflect over the scale 33' due to the motions of the diaphragm in the box 29, the deflection then occurring in the same direction as that turning of the micrometer screw which has to be performed to set the tendency pointer 24 in the zero position. The pointer 32' represents evidently in this case a self adjusting zero mark of the movable scale 33'.

The application of the invention may of course be further modified in different manners. The invention is not to be limited to pressure gauges but it may also advantageously be used in other apparatus by way of example electric measuring apparatus. When the invention is applied to an ammeter built according to the d'Arsonval principle, the apparatus as illustrated in Figure 6 is provided with a compensating system of the same kind as the measuring system, i. e. a rotatable coil. The coil 35 forming the compensating system is provided with a pointer 36 whereas the main coil 37 supports its scale 38 over which the pointer moves. The two coils are arranged, for instance connected in series, so that they will deflect in the same direction when a current is passed through them. The deflection of the main coil proper 37, is several times larger than that of the compensating coil 35, preferably three to five times larger. The ratio between the deflection of the two systems may be adjusted by showing or by giving suitable values to the other factors which determine the deflections of the coils, such, for example, as the force of the magnetic field or the number of turns in the coils. The elastic hysteresis in the compensating system is adjusted by the selection of suitable material and by the number of turns in the helical springs 39 which exhibit a directional torque on the compensating coil and counteract its deflection.

I claim:

1. In an apparatus for measuring variable forces in combination a measuring member movable under the influence of the forces to be measured, a counter-spring acting upon said measuring member, a zero setting device for varying the tension of said counter-spring, a member for compensating the elastic hysteresis of the measuring member, likewise movable under the influence of said forces, a movable index member and a co-operating stationary index member, a gearing transmitting the displacement of the measuring member with an amplifying ratio of gearing to said movable index member so as to indicate the actual position of the measuring member, separate means comprising a movable part and a co-operating stationary part for indicating the actual position of the zero setting device, and separate means transmitting the movements of the compensating member to the movable part of said separate indicating means.

2. In an instrument for measuring variable forces in combination a first member movable under the influence of forces to be measured with a certain elastic hysteresis, a second member likewise movable under influence of said forces with a greater elastic hysteresis relatively to its movements, means for indicating the magnitude of the movement of the first member and independent means under the control of said second member for modifying the indication of said indicating means in a counter-acting sense and in proportion with the movement of the second member so as to compensate for the action of the elastic hysteresis of the first member with regard to the indicating means.

3. In a pressure measuring instrument in combination a first member yielding elastically under the influence of the pressure to be measured, a second member yielding under influence of said pressure with a greater hysteresis relatively to its deformation, means for indicating the deformation of the first member and independent means under the control of the second member for modifying the indication of said indicating means in a counter-acting sense and in proportion with the deformation of the second member so as to compensate for the action of the elastic hysteresis of the first member with regard to the indicating means.

4. In an instrument for measuring variable forces, in combination, a member movable under the influence of the forces to be measured with a certain elastic hysteresis, a second member likewise movable under the influence of said forces with a greater hysteresis relatively to the movements thereof, an indicating device comprising two parts, means for adjusting one of said parts in accordance with the movements of the first member, and separate means for adjusting the second part in accordance with the movements of the second member, independently of the first member and in a counter-acting sense with relation to the indication represented by the first mentioned adjustment so as to compensate for the action of the elastic hysteresis of the first member.

JOSUA GABRIEL PAULIN.